United States Patent [19]
Nicholls et al.

[11] Patent Number: 6,122,531
[45] Date of Patent: Sep. 19, 2000

[54] METHOD FOR SELECTIVELY INCLUDING LEADING FRICATIVE SOUNDS IN A PORTABLE COMMUNICATION DEVICE OPERATED IN A SPEAKERPHONE MODE

[75] Inventors: Richard Brent Nicholls, Sunrise; Scott David Koenigsman; Patrick Joseph Doran, both of Plantation, all of Fla.

[73] Assignee: Motorola, Inc., Schaumburg, Ill.

[21] Appl. No.: 09/127,536

[22] Filed: Jul. 31, 1998

[51] Int. Cl.⁷ .................................................. H04B 1/38
[52] U.S. Cl. ........................... 455/570; 455/79; 704/226
[58] Field of Search ..................................... 455/569, 570, 455/550, 403, 73, 79; 379/420, 421, 432; 370/286, 287; 704/210, 215, 226, 201

[56] References Cited

U.S. PATENT DOCUMENTS

| | | |
|---|---|---|
| 5,649,055 | 7/1997 | Gupta et al. ............................ 704/210 |
| 5,771,440 | 6/1998 | Sukhu et al. ............................. 455/73 |
| 5,867,574 | 2/1999 | Eryilmaz ................................ 455/79 |
| 5,884,194 | 3/1999 | Shiraki .................................. 455/570 |
| 5,897,613 | 4/1999 | Chan .................................... 455/570 |
| 5,937,060 | 8/1999 | Oh ....................................... 370/286 |
| 5,937,375 | 8/1999 | Nakamura ............................. 704/215 |
| 5,960,389 | 9/1999 | Jarvinen et al. ....................... 704/215 |

*Primary Examiner*—Reinhard J. Eisenzopf
*Assistant Examiner*—Lester G. Kincaid
*Attorney, Agent, or Firm*—Scott M. Garrett

[57] ABSTRACT

In a portable communication device (104) that is able to operate in a speakerphone mode, a user interface such as a keypad (120) and display (122) are provided to allow the user to select (1104) an enhanced mode so that leading fricatives of speech are more likely to be detected as speech, and played over a speaker (214). Upon selecting the enhanced mode of operation, the voicing value of each frame of vocoded speech received is increased, thus making it more likely for energetic fricative frames to be detected as speech.

10 Claims, 11 Drawing Sheets

METHOD FOR SELECTIVELY INCLUDING LEADING FRICATIVE SOUNDS IN A PORTABLE COMMUNICATION DEVICE OPERATED IN A SPEAKERPHONE MODE

CROSS REFERENCE

This application is related to co-pending application entitled "Method For Suppressing Speaker Activation In A Portable Communication Device Operated In A Speakerphone Mode" having attorney docket number CM02824J; to co-pending application entitled "Method And Apparatus For Providing Speakerphone Operation In A Portable Communication Device", having attorney docket number CM02826J, and to co-pending application entitled "Method For Detecting Speech In A Vocoded Signal" having attorney docket number CM2882J, all of said applications being commonly assigned with the present application and filed evenly herewith.

TECHNICAL FIELD

This invention relates in general to portable communication devices and communication systems for same, and more particularly to portable communication devices operable in a speakerphone mode, and communication systems for same.

BACKGROUND OF THE INVENTION

Speakerphones have gained widespread acceptance in the market place, and are used by a majority of businesses to facilitate communications. Speakerphones have also become prominent in many consumer markets where they are used as "hands free" phones. However, speakerphones are primarily used in land line communication systems where a regular telephone speaker circuit is replaced by a more powerful one, and a high gain microphone and accompanying circuit is used instead of a conventional circuit. The more powerful speaker and more sensitive microphone are typically used in conjunction with some means for mitigating when these respective components are active. In a typical speakerphone, if the speaker is playing audio signals, if the microphone is not disabled, then the person or persons to which the user of the speakerphone is talking will hear themselves, resulting in undesirable feedback. There are some very expensive speakerphones that include sophisticated echo and feedback cancellation circuits, but the expense of such devices is quite prohibitive. Additionally, there are cordless speakerphones available, but these tend to be simply an extension of cordless phones.

As of the present time, few manufactures have successfully designed a mobile speakerphone, despite the obvious desirability of such a device. That is, a portable communication device, such as a cellular telephone, that is capable of operating in a speakerphone mode. The reasons why such a device has not been successful are numerous and varied. One of the strongest reasons is that a speakerphone, by necessity, requires a more powerful audio output circuit over a conventional cellular phone. A more powerful speaker means more weight and volume, which goes against the goals of portable communication device manufactures. Furthermore, a more powerful speaker could cause a problem if placed in a conventional earpiece location since then there is the risk that a user holding the phone close to their ear, believing the phone to be in a standard mode, could be injured as the result of loud audio being played instead. Consequently, a safe approach is to use a conventional speaker for standard phone mode in the conventional location, a place the more powerful speaker elsewhere in the phone, away from the conventional earpiece location. A second reason why speakerphone implementation is difficult in a portable communication device is the close proximity between the speaker and microphone. If the dual speaker strategy suggested above is used, this is even more problematic since, in general, the portion of the phone where the microphone is located is the farthest away from the earpiece. In order for the speakerphone to sound acceptable, it must mitigate between the speaker and microphone very quickly to avoid clipping out portions of speech, or the user must get used to waiting longer than normal before speaking. To get around this problem in using mobile communications, external devices are used, coupled to the portable communication device as an accessory, that are designed very similarly to conventional land line speakerphones. However these are often worse than conventional speakerphones, depending on ambient noise levels.

Because of the obstacles recited above, and others, the design of a portable communication device operable in a speakerphone mode has proven extremely difficult. Many factors contribute to the perceived quality of any speakerphone, such as speaker mitigation, and the extent to which certain problems are solved dictates to a certain extent the success of the speakerphone in the marketplace. One problem found in speakerphones is the difficulty of detecting voice content in the signal received at the speakerphone. This is typically done by looking at the energy of the incoming signal, and often includes looking at the tonal content of the incoming signal. If the energy is high enough, then the speaker is activated to play the audio information. Using tonal content helps distinguish between noise and voice. However, some parts of speech are difficult to distinguish between noise and speech. In particular, fricative sounds at the beginning of speech may appear to be background noise. Fricative sounds can also be made by, for example, wind noise at the remote parties equipment, such as may be the case if the remote party is calling from an automobile.

DETAILED DESCRIPTION OF A PREFERRED EMBODIMENT

Figure 1:
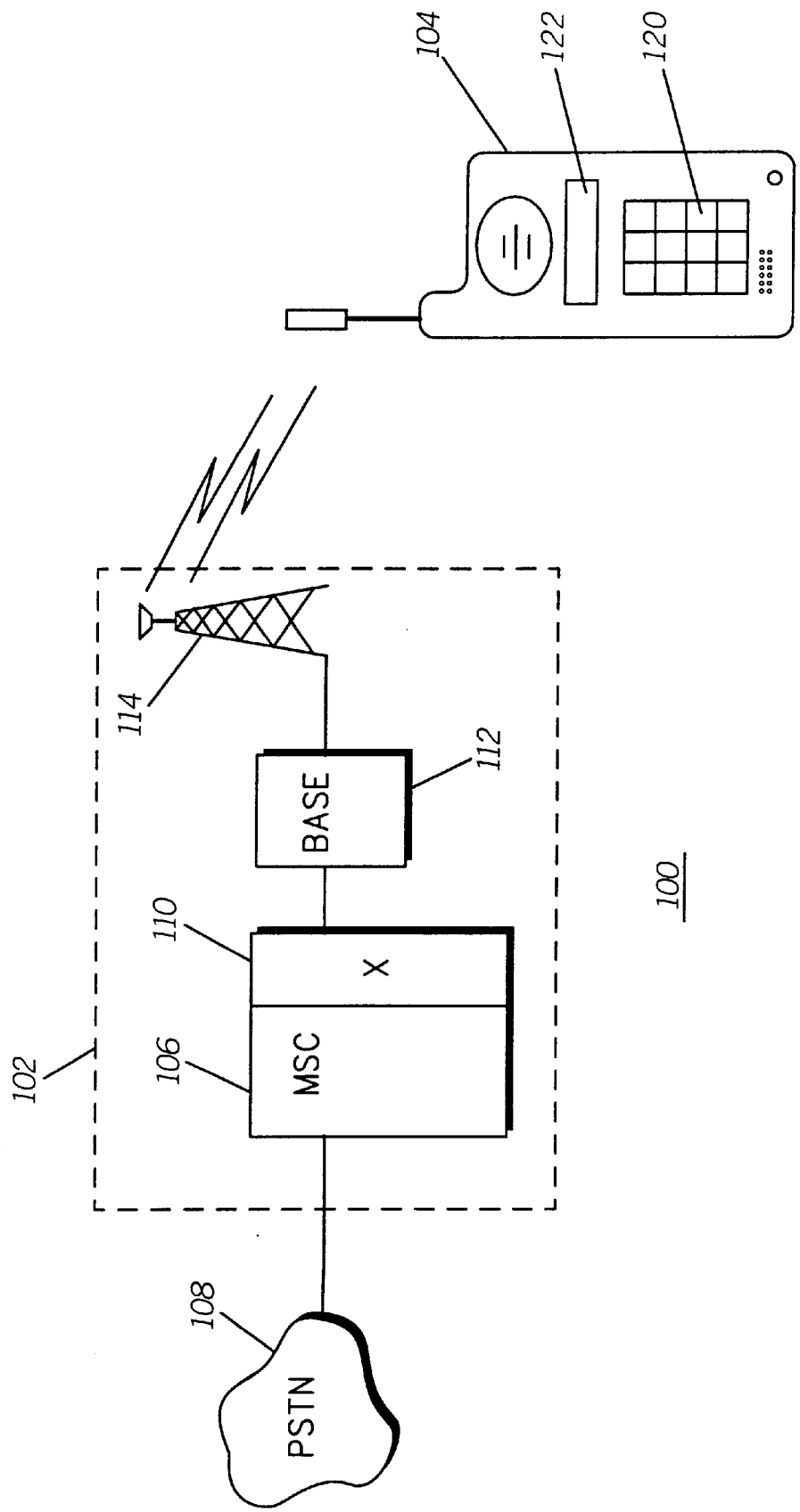
FIG. 1 shows a block diagram of a communication system, in accordance with one embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of deciding when the received audio contains voice or other audio information of interest, and playing the audio information over a speaker while muting the microphone of a portable communication device by taking advantage of parameters resulting from processing the audio data with a vocoder. In most vocoding operations, speech and other audio data is broken into frames, then reduced to a set of digital words or symbols through a mapping process. In addition to the symbols, other parameters are typically provided with each frame, such as a frame energy parameter and a voicing mode parameter, as is known in the art. Typically the frame energy parameter is a result of an autocorrelation performed at the zeroeth position. The voicing mode is a number, typically an integer, indicative of the amount of tonal content of the frame. In general, a low voicing mode figure indicates a fricative sound, whereas a high figure indicates a tonal sound, such as a vowel. These parameters are generated by the transmitting equipment, so a portable communication device has them available in a received signal, and does not need to spend precious computing cycles of generating them. The portable communication device uses the value of these parameters to define a staggered average value of the frame energy or the product of frame energy and voicing mode values, and compares the staggered average value to a threshold value. In general, while the staggered average value is above the threshold value, voice is declared present and the microphone is muted while the received audio information is played over the speaker. While the staggered average value is below the threshold, the speaker is muted while the microphone is active.

Referring now to FIG. 1, there is shown a block diagram of a communication system 100, in accordance with one embodiment of the invention. The system comprises fixed network equipment (FNE) 102, and at least one mobile station 104, such as a portable communication device, capable of engaging in a full duplex communication session, as in cellular telephony. The communication system is a digital communication system, and the FNE can be as provided by the Global System for Mobile communication (GSM) specification. The FNE comprises a mobile switching center (MSC) 106, which is operably coupled to a public switched telephone network (PSTN) 108, and is operably coupled to a transcoder 110. The transcoder converts audio data into vocoded information by any of the known vocoding algorithms. In the preferred embodiment, the communication system uses vector sum excited linear predictive (VSELP) coding, as is known in the art. Typically the audio data is received at the transcoder from the MSC in pulse code modulation (PCM) form, as is common in telephony. The transcoder encodes the outbound audio signal to provide an outbound vocoded signal which it transmits to a base station 112, to which it is operably coupled, in the vicinity of the portable communication device 104. The base station comprises transceiver equipment and is operably coupled to an antenna 114, over which the vocoded signal is transmitted to the portable communication device. The portable communication device receives the vocoded signal over a radio link. At the same time, the portable communication device may be performing vocoding of an ambient audio signal, and transmitting it to the base station in the form of an inbound vocoded signal. In general, signal transmitted by the base station are referred to as outbound signals while signal transmitted by the portable communication device are referred to as inbound signals. The inbound vocoded signal received from the portable communication device is sent to the transcoder, where it is converted to an inbound audio signal such as, for example, pulse code modulation data.

Figure 2:
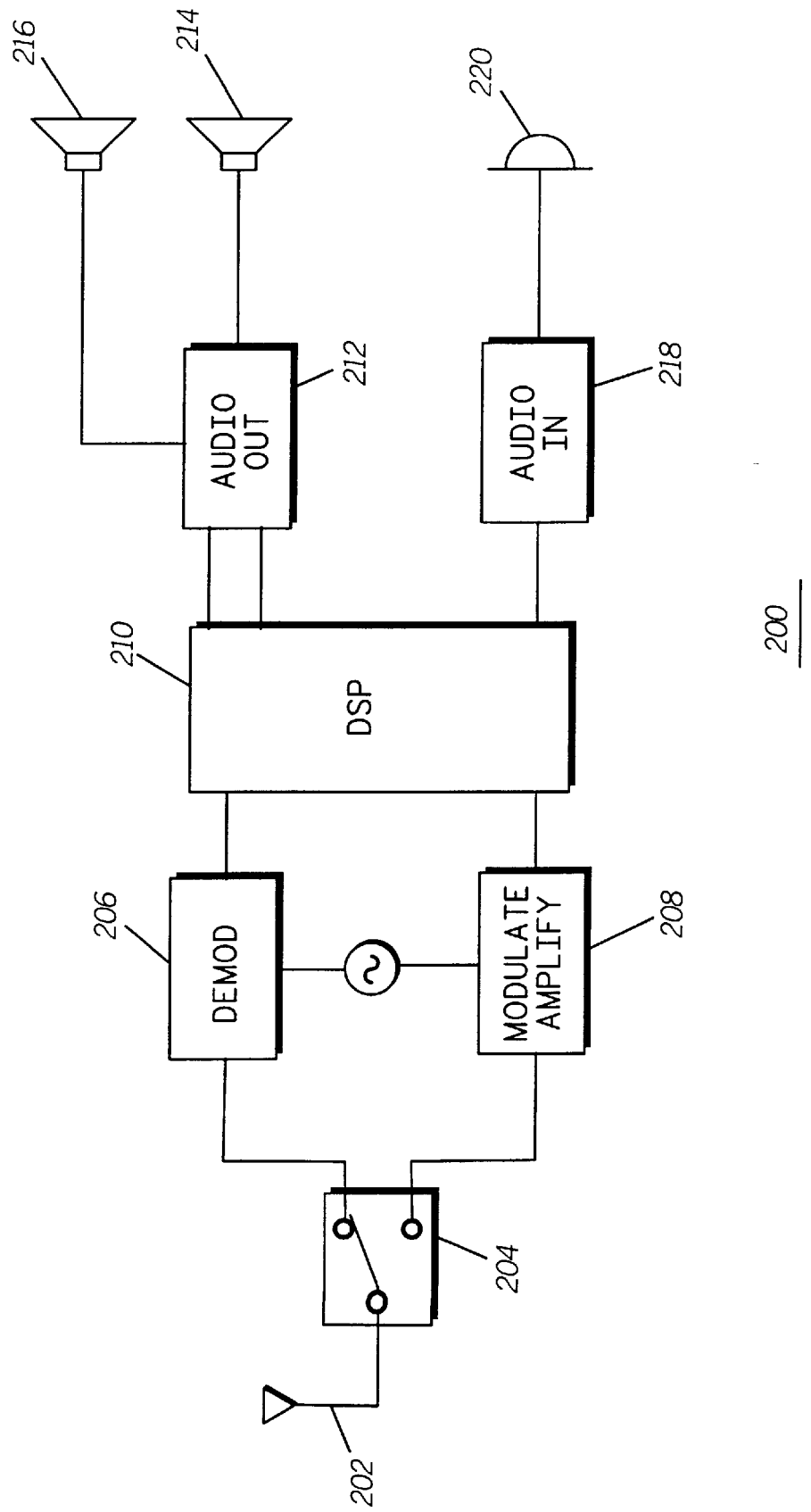
FIG. 2 shows a block diagram of a portable communication device operable in a speakerphone mode, in accordance with one embodiment of the invention.

Referring now to FIG. 2, there is shown a block diagram of a portable communication device 200 operable in a speakerphone mode, in accordance with one embodiment of the invention. The portable communication device is the same as that shown in FIG. 1, referred to with reference numeral 104. The device comprises an antenna 202 coupled to an antenna switch 204, as is common in the art. The antenna switch selectively couples the antenna to either a receiver 206 or a transmitter 208. The antenna and receiver form a means for receiving signals, while the antenna and the transmitter forma means for transmitting signals. Both the receiver and transmitter are coupled to a digital signal processor (DSP) 210. The DSP is a means for calculating and a means for providing certain values, and performs functions such as, for example, decoding and encoding forward error correcting codes, baseband processing, and so on. The DSP may also perform the voice encoding and decoding (vocoding). The DSP passes received audio information to an audio out circuit 212 for playing over a speaker 214. The speaker and audio out circuit form a speaker circuit. In the preferred embodiment, the speaker 214 is a first speaker for selectively playing audio information at a speakerphone volume, for example, and the portable communication device further comprises a second speaker 216 for selectively playing audio at a conventional telephone earpiece volume. Whenever audio information is being played over the speaker in speakerphone mode, the microphone 220 must be muted to eliminate echo. To mute the microphone, the DSP can simply disregard any data received during the time period of which the muting should last. Whether the first or second speaker is used may be user selectable. Furthermore, the first speaker may also be used when the portable communication device is operated in a dispatch mode, as with integrated services digital radio communication systems.

The portable communication device also comprises an audio in circuit 218 for processing ambient audio information received from the microphone 220 for receiving audio signals. The audio in and audio out circuits may be combined on a single codec, as is known in the art. The microphone and audio in circuit form a microphone circuit. The audio in circuit passes signals to the DSP, which in turn performs encoding and baseband processing, as known in the art. The transmitter then modulates the baseband signal provided by the DSP, and transmits the inbound signal to the base station, as in FIG. 1.

Figure 3:
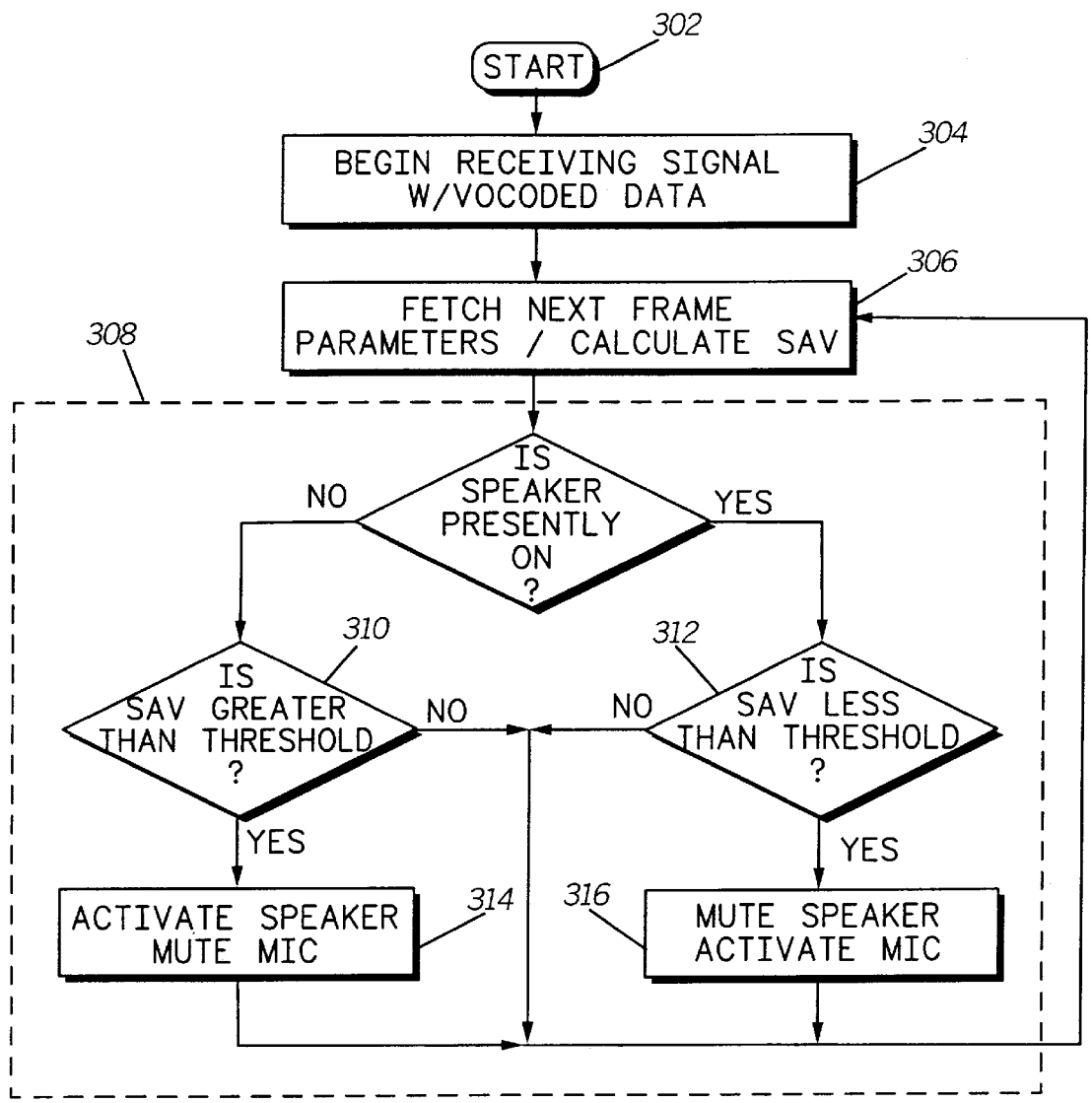
FIG. 3 shows a flow chart diagram of a method for determining when to activate a speaker, in accordance with one embodiment of the invention.

Referring now to FIG. 3, there is shown a flow chart diagram 300 of a method for determining when to activate a speaker, in accordance with one embodiment of the invention. In general, FIGS. 3–9 and the accompanying description hereinbelow discloses a novel method for detecting speech activity in a vocoded signal, which has numerous applications, one of which is determining when to activate the speaker of a portable communication device and at the same time mute an associated microphone. At the start 302 of the method, the portable communication device has established a full duplex communication session with a base station. In the vernacular of the art, the communication device is registered, and has entered into a phone call with a remote party. Also, the user of the device has selected speakerphone operation. The communication device is therefore receiving (304) a vocoded signal form the base station. The vocoded signal is comprised of a succession of frames, with each frame containing audio information and a corresponding frame energy value and, preferably, a frame voicing value. The DSP will then fetch (306) the first, or next frame parameters. The DSP begins calculating a staggered average value. By staggered average, it is meant that changes in one direction of a given parameter, such as the frame energy value, change the staggered average value to the current parameter value, while changes in the other direction result in the staggered average value being adjusted by an averaging function, resulting in a decay from the previous value. After fetching the next frame parameters and calculating the staggered average value, the device executes a decision block 308, which includes performing the steps of providing a threshold voice indicator value; playing the audio information over the speaker when the staggered average is greater than the threshold voice indicator value; and, while performing the step of playing, muting a microphone of the portable communication device to prevent audio feedback. The staggered average value and threshold voice indicator value are compared in decision boxes 310 and 312. As a result of performing those comparisons, if something must be changed from present state of the speaker and microphone, then the change occurs in accordance with boxes 314 and 316. In box 314, the speaker is activated and the microphone muted, awhile the opposite occurs in box 316. Once the requisite action has been taken, the communication device returns to fetch the next frame parameters. If after performing one of the comparisons, either 310 or 312, and no change is necessary, the communication device returns to fetch the next frame parameters without any change of the speaker and microphone states.

Figure 4:
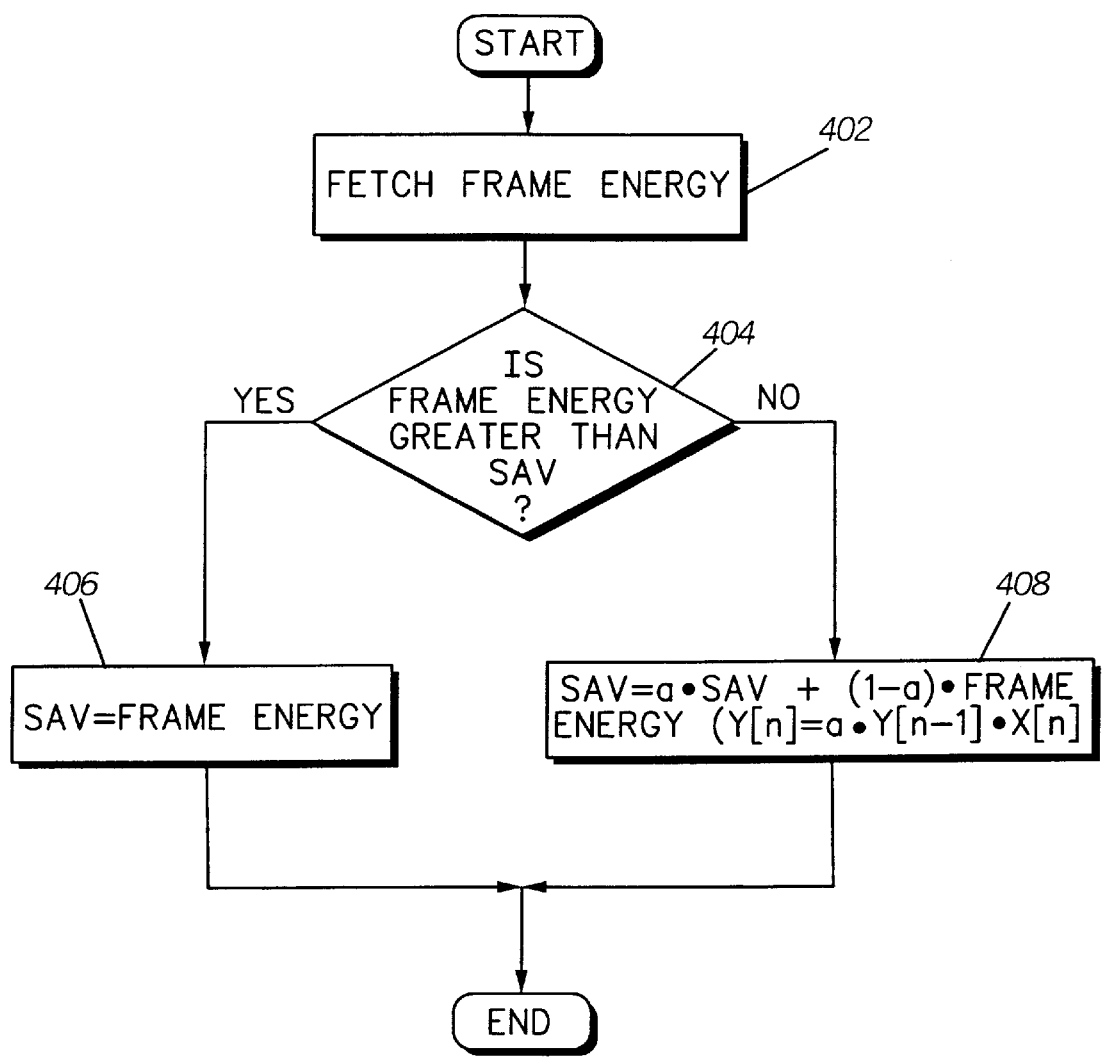
FIG. 4 shows a flow chart diagram of a method for updating parameters used in determining when to activate a speaker, in accordance with one embodiment of the invention.

Referring now to FIG. 4, there is shown a flow chart diagram 400 of a method for updating parameters used in determining when to activate a speaker, in accordance with one embodiment of the invention. The whole of what is shown in FIG. 4 is performed in box 306 of FIG. 3. First, the communication device loads or fetches the frame energy value (402) of the current frame. Next a decision is performed (404), where the frame energy value is compared to the staggered average value (SAV). Initially, the staggered average value may be set to any value, but zero is appropriate. If the frame energy is greater than the staggered average value, the staggered average value is set equal to the frame energy value, as in box 406. However, if the present staggered average value, meaning the staggered average value that was previously determined, is greater than the current frame energy value, than the current staggered average value is calculated by reducing the present staggered average value by an averaging factor. The averaging factor may be a preselected constant, but in the preferred embodiment it has the form of:

$$y[n]=a \cdot y[n-1]+(1-a) \cdot x[n],$$

where:
  y[n] is the current staggered average value;
  a is a scaling factor having a value from zero to one, preferably at least 0.7;
  y[n−1] is the present staggered average value; and
  x[n] is the current frame energy value.

Figure 5:
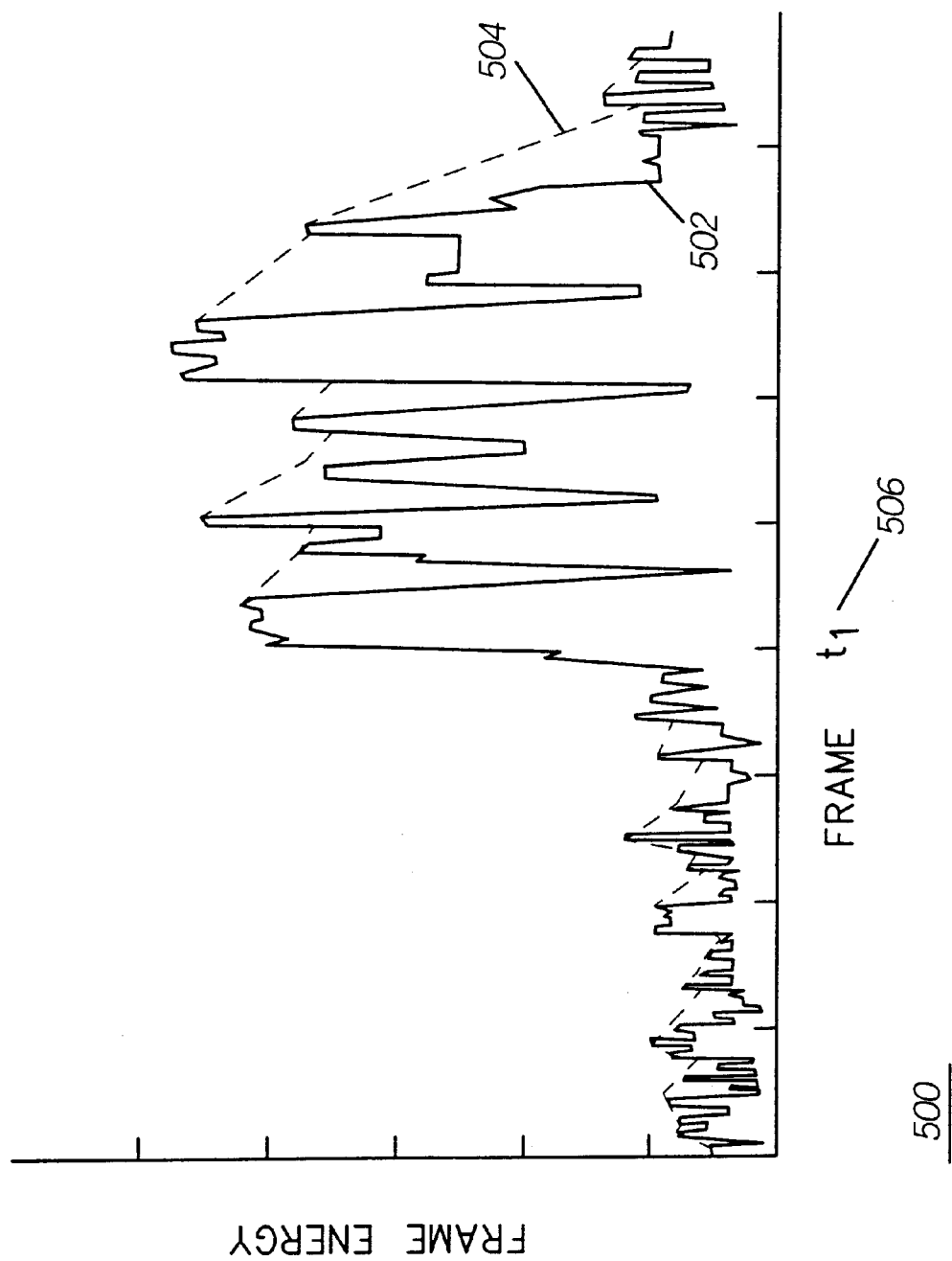
FIG. 5 shows a graph of frame energy over time and a staggered average value derived therefrom, in accordance with one embodiment of the invention.
Figure 6:
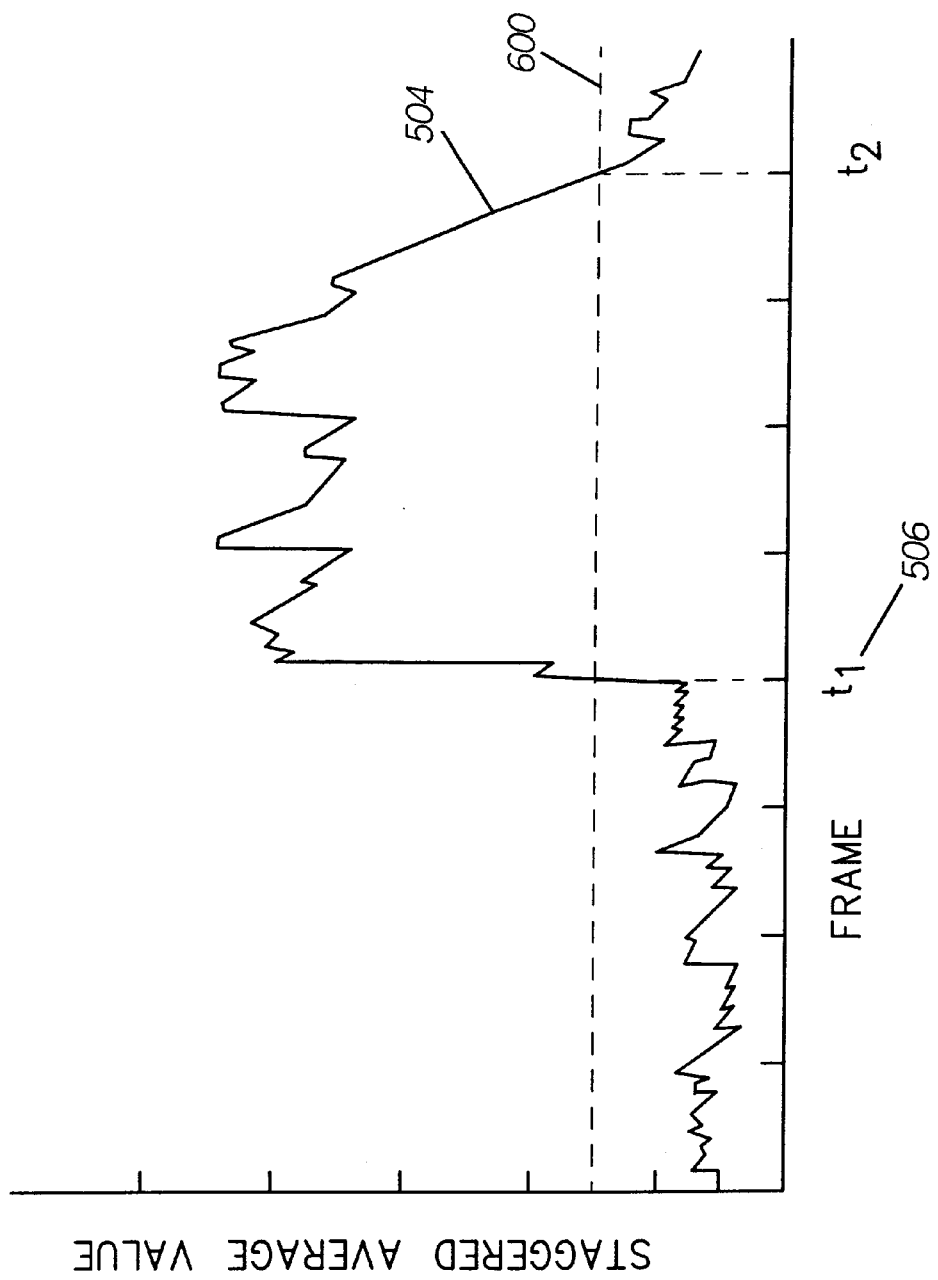
FIG. 6 shows a graph of a staggered average value over time compared to a threshold, in accordance with one embodiment of the invention.
Figure 7:
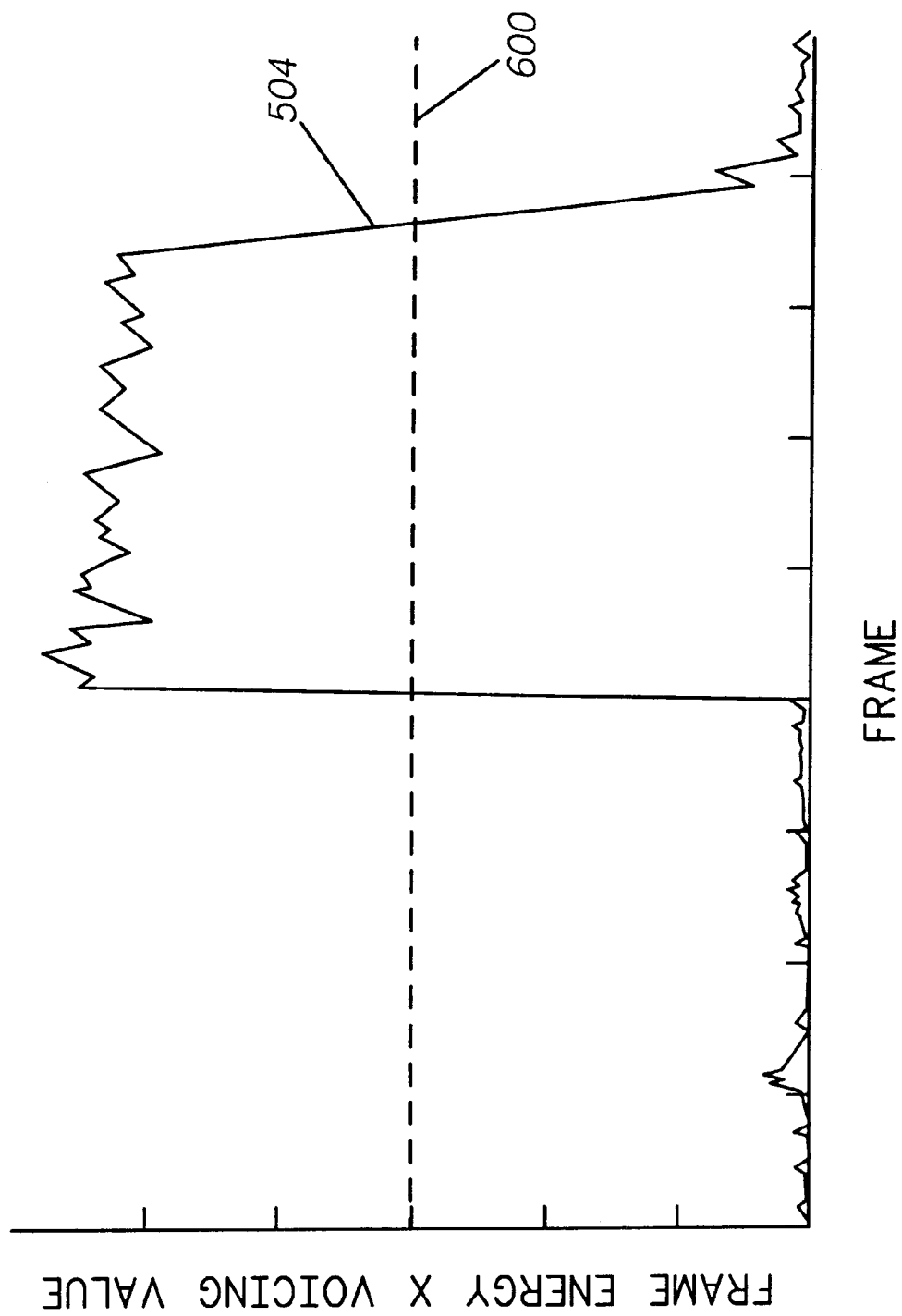
FIG. 7 shows a graph of the product of frame energy value and voicing value over time, in accordance with the invention.

Referring now to FIG. 5, there is shown a graph 500 of frame energy over time and a staggered average value derived therefrom, in accordance with one embodiment of the invention. Frame energy is the solid line 502 while the staggered average value is represented by the broken line. FIG. 6 shows the same graph without the frame energy and only the staggered average value, here as a solid line 504. At some time $t_1$ (506), the remote party begins speaking. In FIG. 6, there is shown a broken line 600 at a constant value of frame energy, and represent a threshold voice indicator value. When the staggered average 504 is greater than the threshold voice indicator value, the speaker will be activated and the microphone muted. From the graph in FIG. 6, it can be seen that the speaker will therefore be active between time $t_1$ and time $t_2$. However, going by the frame energy 502, it can be seen that there are several periods where the frame energy drops below the threshold voice indicator value, as would be the case when a person spoke a sentence where there are brief pauses in speech between words. However, if the speaker were alternately activated and muted in correspondence with these excursions, the result would be clipping of brief portions of audio information, which is avoided by using the staggered average value to base decisions on instead.

Although mitigating speaker and microphone states based on frame energy alone, as in the previous example, is effective, the decision making can be enhanced. It may sometimes be the case that the remote party is in a noisy environment, and the background noise may be heard. Typically background noise is highly fricative, and tends to degrade the voicing value of the remote party's voice signal. However, it has proven to be the case that, generally speaking, a person in a noisy environment tends to speak louder. If not, than the user of the portable communication device may request that the remote party speak louder. In the preferred embodiment instead of simply using frame energy alone on which to base decisions, using the product of the frame energy value and the voicing value has been found to sharpen the staggered average value. In VSELP, frame energy is given as r0, which is known to mean the evaluation of the autocorrelation function at the zeroeth position, and voicing values are integers 0, 1, 2, or 3. Thus, frames with high voicing values, even though they may have mid-low range frame energy values, will be emphasized. This effect can be seen in FIG. 7, where the vertical axis, instead of being frame energy alone, is the product of the frame energy value and voicing value. The staggered average value 504 is still proportional to frame energy, but on a frame by frame basis, the emphasis of voicing mode dramatically changes and sharpens the graph over time. This allows the threshold voice indicator value 600 to be increased to further separate frames containing voice content and frames without voice content. At the same time, much of the background noise, which is mostly, if not purely fricative, will result in a product of zero in VSELP. The staggered average value envelope will still allow frames with low voicing values to be played once the speaker is activated, but basing the staggered average value and threshold voice indicator value on the product of frame energy value and voicing value sharpens the decision making.

Figure 8:
FIG. 8 shows a graph of a staggered average value over time compared to a dynamic threshold, in accordance with one embodiment of the invention.

Another technique that has been found to contribute to the clarity of a speakerphone in a portable communication device is illustrated in FIG. 8, and has to do with determining the threshold voice indicator value. Since the threshold voice indicator value is the value that determines when the staggered average value indicates voice is present in the received audio information, it can and should be optimized. In the discussion hereinabove in reference to FIG. 6, the threshold indicator value was shown as a constant value, which will provide acceptable results. However, in the preferred embodiment, the threshold voice indicator value is dynamic, and changes with the average frame energy under non-voiced conditions. In practice, and as shown in FIG. 8, a first frame energy average 800 is calculated, but is only updated when the voicing value is low enough to indicate an unvoiced frame, and the staggered average value is below the threshold voice indicator value. The average is a running average. In the preferred embodiment, using VSELP, the frame energy average is only updated when the voicing value is zero, and the staggered average value falls below the previous threshold voice indicator value. Thus, in the time between $t_1$ and $t_2$ the average 800 remains constant. Outside of that time, and assuming the voicing value is sufficiently low, the average changes with frame energy. The average may, for example, be calculated using the formula $y[n]=a \cdot y[n-1]+(1-a) \cdot x[n]$, described above in reference to calculating the staggered average value, but without the instantaneous changes when the frame energy increases. The dynamic threshold voice indicator value 802 is calculated by adding a preselected constant to obtain an identical graph to the average offset by the constant. It is a matter of engineering choice as to what constant to select. Calculating the threshold voice indicator value in this manner enhances the operation of a speakerphone in a portable communication device by turning on the speaker earlier when the received signal is relatively clean and noise free, and reduces the amount of noise heard over the speaker when the received signal contains a higher amount of noise.

Figure 9:
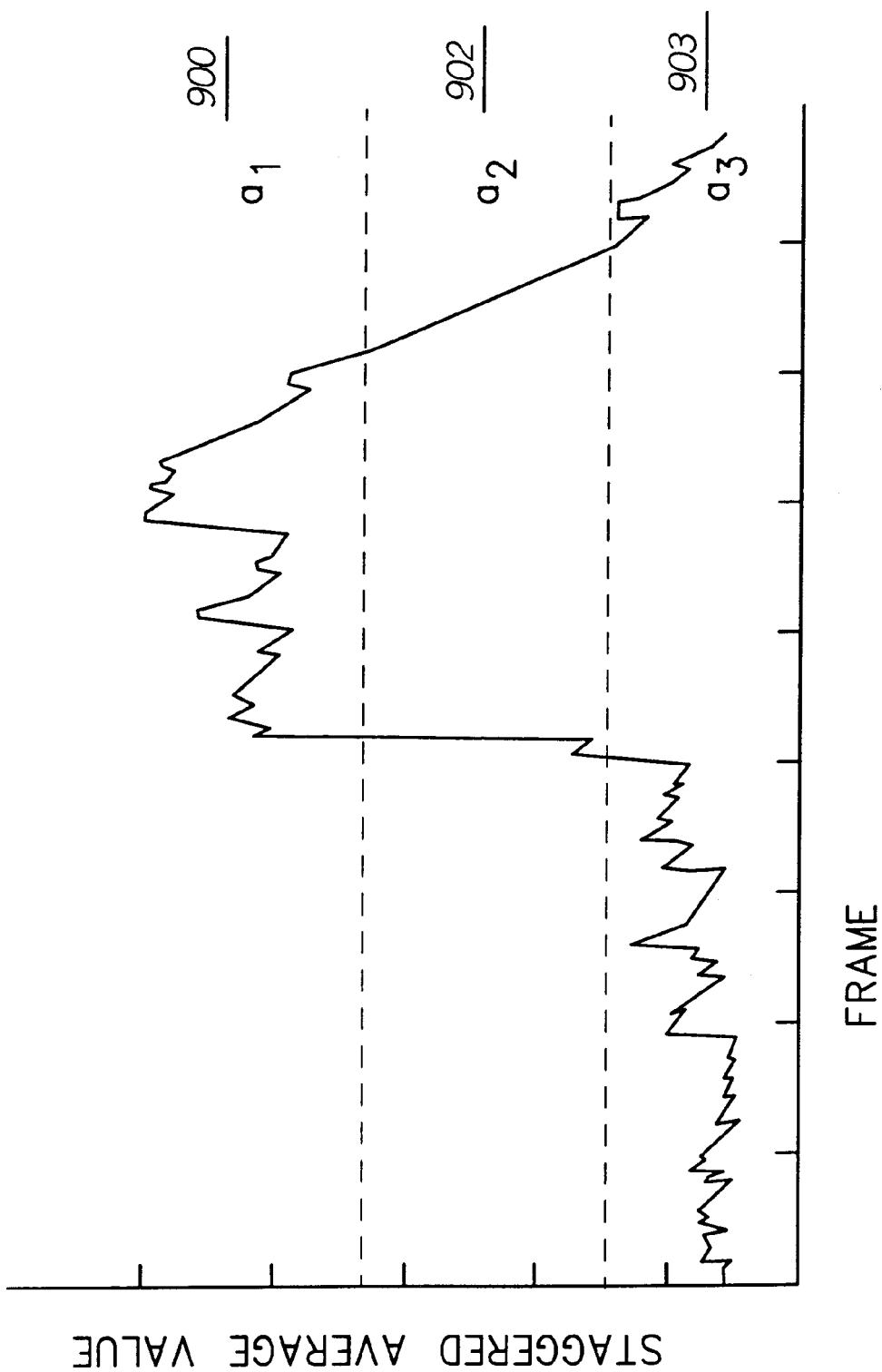
FIG. 9 shows a graph of a staggered average value over time showing separate zones wherein the staggered average value decays at a different rate depending on the present zone, in accordance with one embodiment of the invention.

Another technique that has been found to significantly increase the quality of speakerphone operation in a portable communication device in accordance with the present invention is described in reference to FIG. 9. Referring now to FIG. 9, there is shown a graph of a staggered average value over time showing separate zones wherein the staggered average value decays at a different rate depending on the present zone, in accordance with one embodiment of the invention. In general the problem here is that when a staggered average value is used, if the remote party stops speaking and the staggered average is high, particularly if the product method of calculating the staggered average is used, there may be an excessive lag between the time when the remote party stops speaking, and the staggered average value falls sufficiently low so that speech is no longer declared present and the microphone is enabled. The result would be that is the user of the portable communication device started speaking immediately after hearing the remote party stop speaking, the initial portion of the user's speech would not be transmitted since the microphone had not been activated, and the remote party would not hear that portion of the user's speech. To solve this problem, the scaling factor used in the decay calculation of the staggered average value varies with the magnitude of the staggered average value. In general, the higher the staggered average value, the lower the scaling factor. So, in the equation $y[n]=a \cdot y[n-1]+(1-a) \cdot x[n]$, where a is the scaling factor, a decreases as the staggered average value increases. Thus, the higher the staggered average value, the more weight a lower frame energy value or product value (r0•voicing) will have in calculating a new staggered average value. In the preferred embodiment, it has been found that it is sufficient to define zones of the staggered average value, and assign a different scaling factor to each zone. Thus, in a first zone 900, a first scaling factor $a_1$ is used, in a second zone 902 a second scaling factor $a_2$ is used, and in a third zone 903 a third scaling factor $a_3$ is used, where $a_1<a_2<a_3$. By using smaller scaling factors, essentially weighting lower value more in the averaging calculation, less time is required before releasing the microphone and muting the speaker when the speech content of a received signal ends, thus avoiding the problem of clipping the initial portion of speech of the user of the speakerphone.

As mentioned hereinabove, the step of muting the microphone, and more specifically, not transmitting any signal during the time the audio out circuit is playing audio information over the speaker, can be performed in a variety of ways. A conventional hardware method would be to turn off the microphone so that an audio signal is not generated. However, in modern portable communication devices, such a method is not as simple as it might seem. For one, the voice activity detection routine is performed by a DSP. In order to get the microphone muted by hardware, the DSP must send a request to a host processor, the request must be processed by the host processor, and so on. In general such a scheme will result in an unacceptable delay in muting the microphone.

A simpler and quicker method can be accomplished by the DSP. In a typical portable communication device that operates in a full duplex mode, such as a cellular telephone, the signal processing circuitry performs echo suppression. Echo is obviously a potential problem while operating as a speakerphone, but can also be problematic in a standard telephone if the volume of the earpiece speaker is sufficiently loud. A conventional way to suppress echo is to compare the inbound audio signal from the microphone with the outbound audio signal received from the base station. If the signals are sufficiently similar, as determined by conventional means, then echo is declared. Once echo is declared, the processing circuitry, rather than sending the inbound audio signal containing the echo, silence information is sent.

Silence information is derived from the background noise detected at the microphone. Conventionally, silence information is used to reduce battery drain in portable communication devices; if the user of the device is not speaking, rather than continue to transmit, the device periodically transmits silence information which is used by the receiving equipment, such as a base station, to reconstruct the background noise. This is known in the art as discontinuous transmission. To a listener it provides an audible signal which asserts the continued presence of the person speaking, despite a lack of speech. Silence information is readily available in many vocoded signals, and in VSELP a type of silence information is provided and is referred to as comfort noise.

In measuring echo in the inbound audio signal, an echo threshold is selected, and if the difference between the outbound signal energy and the inbound signal energy is greater than the threshold, echo is declared and silence information is sent. Otherwise, if the echo threshold is not exceeded, the inbound signal is processed as normal. To mute the microphone during speaker phone operation, whenever voice is detected at the speaker (speech has been declared), the DSP sets the echo threshold to a very low value, such that the echo suppression algorithm always declares echo, resulting in only silence information being sent. Conversely, when speech is not detected in the outbound vocoded signal received from the base station, the speaker is muted so echo is not possible, and the echo threshold is set very high so that echo is never declared. As a result, the microphone is always active, although during silence periods in the inbound audio signal, silence information will still be sent. If the communication device is operated in a standard phone mode, the echo threshold is set to a nominal value.

Figure 10:
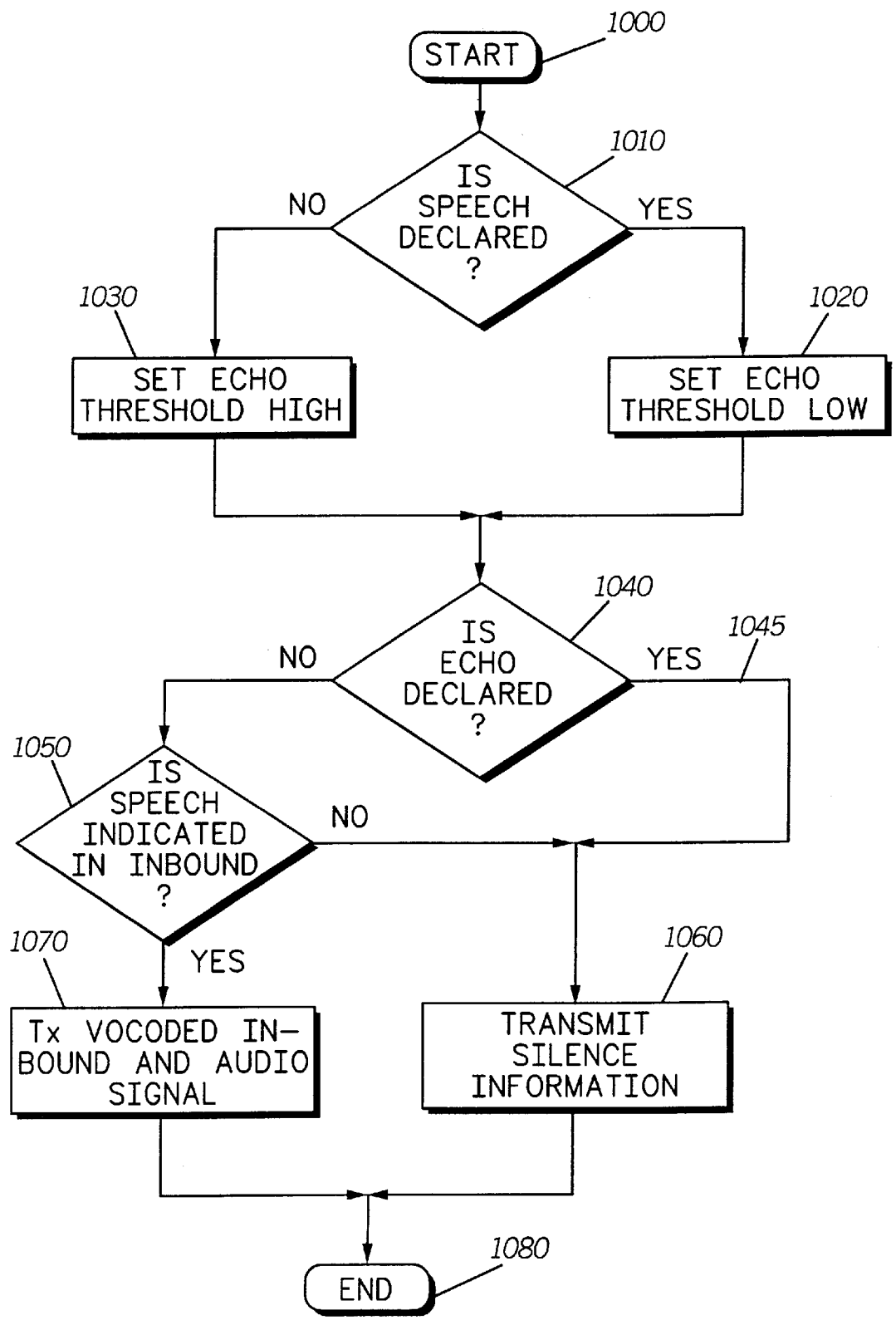
FIG. 10 shows a flow chart for a method of muting a microphone, in accordance with the invention.

An example of this process is illustrated in FIG. 10. At the start 1000 the user of the communication device has selected the speakerphone mode of operation. First, the step of declaring speech is performed (1010), preferably as described hereinabove. If speech has been declared present (1020), the echo threshold is set to a very low level to ensure that echo will always be declared. IF speech was not detected in the received outbound vocoded signal (1030), the echo threshold is set to a high value to ensure that echo is not declared. Next, the step of performing echo detection (1040) is performed, based on the echo threshold. This step is the same as that performed by the communication device when operated in a standard telephone mode. If the echo threshold has been set low, echo will be declared (1045), and silence information will be sent (1060). If the echo threshold has been set high, then echo will not be declared, the step of evaluating the inbound audio signal content for speech activity is performed (1050). The step of evaluating (1050) may be the same as that used by the communication device when operated in a standard telephone mode. If speech is not detected, then silence information is sent (1060), and if speech is detected in the inbound audio signal, the vocoded inbound audio signal is transmitted (1070). The method shown described here in reference to FIG. 10 is repeated as long as the communication device is in the speakerphone mode. If the communication device is reconfigured to operate in a standard telephone mode, the echo threshold will be set to a nominal value.

Leading Fricatives

In processing speech to activate or mute the speaker, there are naturally occurring phenomena in speech which make perfect speech detection very difficult. One such phenomena is referred to as a leading fricative. A leading fricative is a fricative that occurs at the beginning of a section of speech, after a period of silence. Fricative sounds, because of their unvoiced quality, can be easily mistaken for background noise, and particularly wind noise. In the method of detecting speech taught hereinabove, where the staggered average value is derived from the product of the frame energy and the voicing value for each received frame, purely fricative frames will never result in speech being declared present, and background sounds, even highly energetic ones, such as wind noise, will not be played unless there is voice over the background sound. However, this means leading fricatives of speech will likely not be played either, even in the total absence of fricative background noise at the remote party's end.

Since VSELP and other voice coding scheme produce a voicing value of zero for purely fricative frames, the product of frame energy and voicing value will also be zero, thus, the staggered average value will not be increased by a leading fricative. However, the problem could be alleviated if the remote party were always in a quiet environment, by increasing the voicing value of every frame. Since it is likely that a leading fricative, despite being unvoiced, will have substantial frame energy, it is highly likely that by enhancing the voicing value of each frame received that a leading fricative will be played. However, if the voicing value is always enhanced, then certain energetic background sounds may result in a declaration of speech and be played as well. However, it would be very difficult for the communication device to detect when the remote party is in a noisy environment or in a quiet environment but speaks a leading fricative.

The present invention allows the user of the communication device to selectively decide if the speakerphone is to operate in a standard mode, where the voicing value is not changed, or in an enhanced speakerphone mode where the voicing value is increased. Thus, according to the present invention, the communication device of FIG. 1 is provided with a user interface comprised of, for example, a keypad 120, a display 122, and associated software as is routine in the art. In the preferred embodiment the device 104 displays an options menu from which the user can select a number of options, including a speakerphone option. If the user selects the speakerphone option, by, for example, pressing an associated button on the keypad, a second option for operating in the enhanced mode is presented. If not selected, then the communication device will not enhance the voicing value of received frames. If the enhanced option is selected, then the voicing value will be enhanced. In the preferred embodiment, the VSELP voicing value of each frame is increased by one in the enhanced speakerphone mode. The portable communication device then provides speakerphone operation as otherwise described hereinabove. In the preferred embodiment, the user can toggle between standard and enhanced speakerphone modes at will.

Figure 11:
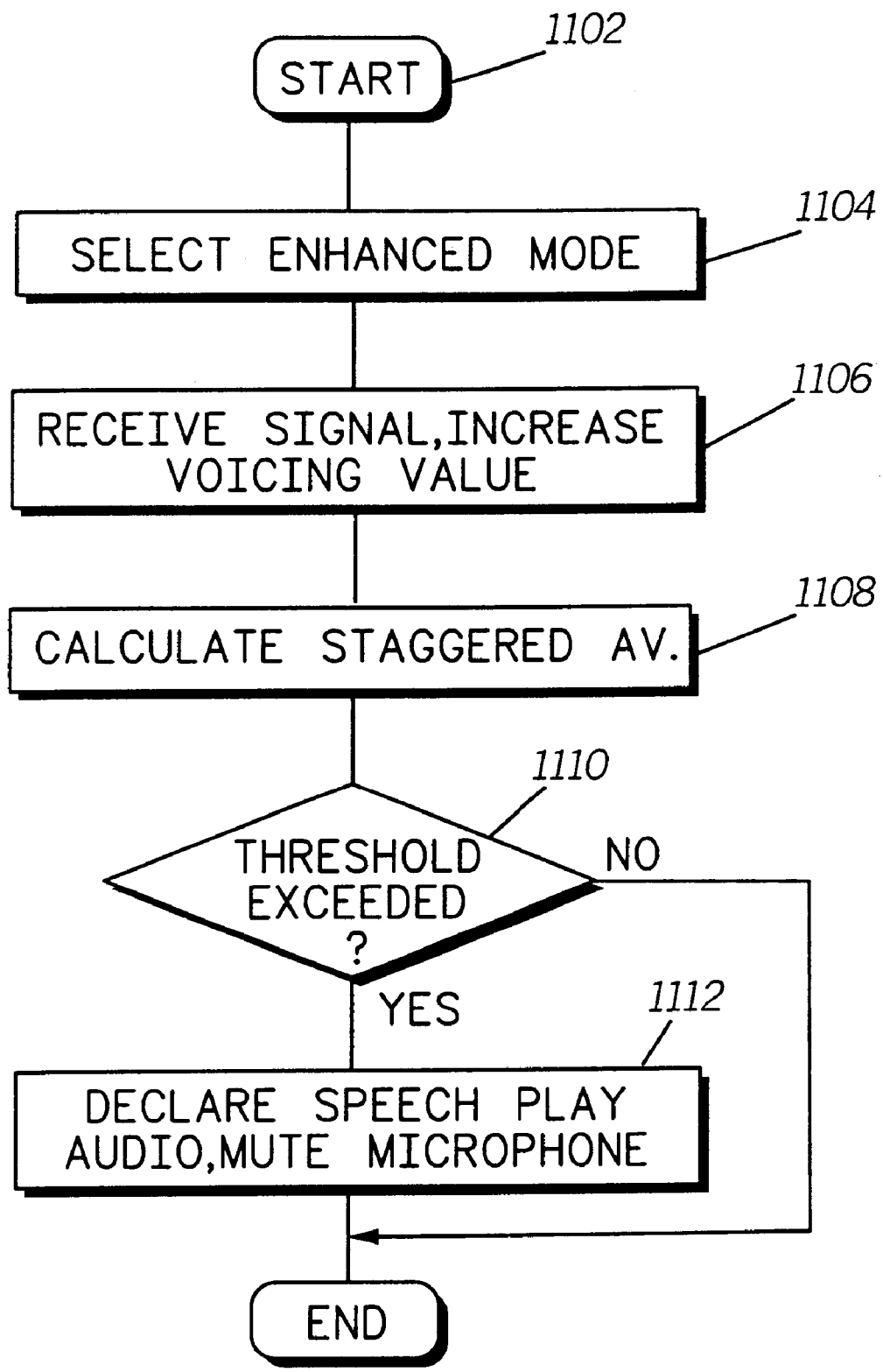
FIG. 11 shows a flow chart for a method of enhanced speakerphone mode.

FIG. 11 illustrates operation in an enhanced speakerphone mode. At the start 1102 the user has selected speakerphone operation. The first step (1104) is selecting an enhanced speakerphone mode, performed by the user via the user interface. Prior to performing the step of selecting an enhanced speakerphone mode, or at some time thereafter, the communication device begins receiving the vocoded signal as described hereinabove. As each frame is received, an enhanced voicing value will be calculated. Then the staggered average value will be calculated (1108) by taking the product of the frame energy value and the enhanced voicing value. If the present or previous staggered average value is less than the product, the current staggered average value will be set equal to the product, decayed otherwise, as taught hereinabove. Next, the comparison of the current staggered average value and the threshold voice indicator is performed (1110). If the threshold is exceed, the step of playing the audio information over the speaker while muting a microphone (1112) is performed.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for selectively including leading fricative sounds in a portable communication device operated in a speakerphone mode, comprising the steps of:

selecting an enhanced speakerphone mode, performed by a user via a user interface of the portable communication device;

receiving a vocoded signal comprised of a plurality of frames, each of the frames having audio information, a frame energy value, and a voicing value included therewith;

for each of the plurality of frames:
  calculating an enhanced voicing value;
  calculating a staggered average value derived from the product of the frame energy value and the enhanced voicing value;
providing a threshold voice indicator value;
playing the audio information over the speaker when the staggered average value is greater than the threshold voice indicator value; and
while performing the step of playing, muting a microphone of the portable communication device to prevent audio feedback.

2. A method for selectively including leading fricative sounds in a portable communication device as defined in claim 1, wherein the step of calculating a staggered average value comprises:
  comparing a current frame energy value with a present staggered average value;
  if the current frame energy value is greater than the present staggered average value, setting the staggered average value equal to the current frame energy value; and
  if the current frame energy value is less than the present staggered average value, calculating a current staggered average value by reducing the present staggered average value by an averaging factor.

3. A method for selectively including leading fricative sounds in a portable communication device as defined in claim 2, wherein in the step of calculating, the averaging factor has a form of $y[n]=a \cdot y[n-1]+(1-a) \cdot x[n]$, where:
  y[n] is the current staggered average value;
  a is a scaling factor having a value from zero to one;
  y[n−1] is the present staggered average value; and
  x[n] is the current frame energy value.

4. A method for selectively including leading fricative sounds in a portable communication device as defined in claim 3, wherein in the step of calculating, the scaling factor has a value of at least 0.8.

5. A method for selectively including leading fricative sounds in a portable communication device as defined in claim 3, wherein in the step of calculating, the scaling factor has a value dependent on the current frame energy value.

6. A method for selectively including leading fricative sounds in a portable communication device as defined in claim 5, wherein in the step of calculating, the value of the scaling factor is dependent on a range of the current frame energy value.

7. A method for selectively including leading fricative sounds in a portable communication device as defined in claim 1, wherein in the step of playing the audio information, the threshold voice indicator value is a constant value.

8. A method for selectively including leading fricative sounds in a portable communication device as defined in claim 1, wherein the step of providing a threshold voice indicator value comprises calculating a running average of the frame energy when the staggered average value is below a previous threshold voice indicator value and a voicing value corresponding to the frame energy value indicates an unvoiced frame.

9. A method for selectively including leading fricative sounds in a portable communication device as defined in claim 1, wherein the step of muting the microphone comprises:
  setting an echo threshold to a sufficiently low value;
  performing an echo detection routine;
  declaring echo to be present; and
  transmitting silence information.

10. A portable communication device for use in an enhanced speakerphone mode, comprising:
  a user interface for selecting the enhanced operating mode
  means for receiving a vocoded signal having a succession of frames, each frame containing audio information and a corresponding frame energy value and a frame voicing value;
  means for providing an enhanced voicing value from the voicing value;
  means for calculating a staggered average value derived from the product of the frame energy value and the enhanced voicing value;
  means for providing a threshold voice indicator value;
  a speaker circuit for playing the audio information over a speaker when the staggered average value is greater than the threshold voice indicator value; and
  a microphone circuit for receiving ambient audio information when the audio information is not being played on the speaker.

* * * * *